US012500368B2

(12) United States Patent
Metzler et al.

(10) Patent No.: US 12,500,368 B2
(45) Date of Patent: Dec. 16, 2025

(54) PROTECTIVE CAP

(71) Applicant: HIRSCHMANN AUTOMOTIVE GMBH, Brederis (AT)

(72) Inventors: Andreas Metzler, Muntlix (AT); Markus Kalb, Dornbirn (AT); Matthias Summer, Rankweil (AT)

(73) Assignee: Hirschmann Automotive GmbH, Rankweil/Brederis (AT)

( * ) Notice: Subject to any disclaimer, the term of this patent is extended or adjusted under 35 U.S.C. 154(b) by 289 days.

(21) Appl. No.: 18/021,513

(22) PCT Filed: Oct. 6, 2021

(86) PCT No.: PCT/EP2021/077503
§ 371 (c)(1),
(2) Date: Mar. 12, 2023

(87) PCT Pub. No.: WO2022/078827
PCT Pub. Date: Apr. 21, 2022

(65) Prior Publication Data

US 2023/0299534 A1 Sep. 21, 2023

(30) Foreign Application Priority Data

Oct. 16, 2020 (DE) ......................... 102020127339.8

(51) Int. Cl.
*H01R 13/50* (2006.01)
*H01R 13/58* (2006.01)

(52) U.S. Cl.
CPC ....... *H01R 13/501* (2013.01); *H01R 13/5812* (2013.01)

(58) Field of Classification Search
CPC .............. H01R 13/501; H01R 13/5812; H01R 2201/26
See application file for complete search history.

(56) References Cited

U.S. PATENT DOCUMENTS

| | | | | |
|---|---|---|---|---|
| 8,574,000 | B1 | 11/2013 | Smith | |
| 8,845,359 | B2 * | 9/2014 | Taylor | H01R 13/58 439/447 |
| 9,017,109 | B2 * | 4/2015 | Gotou | H01R 13/5812 439/718 |
| 9,088,099 | B2 * | 7/2015 | Urashima | H01R 13/516 |
| 9,287,652 | B2 | 3/2016 | Torii | |
| 9,698,522 | B2 * | 7/2017 | Markefka | H02G 15/007 |
| 10,644,440 | B2 * | 5/2020 | Sugimoto | H01R 13/5812 |

(Continued)

FOREIGN PATENT DOCUMENTS

| | | | |
|---|---|---|---|
| EP | 1198029 | A | 4/2002 |
| GB | 2351188 | A | 12/2000 |

*Primary Examiner* — Travis S Chambers
(74) *Attorney, Agent, or Firm* — Harness, Dickey & Pierce, P.L.C.; Anthony G. Fussner

(57) ABSTRACT

The invention relates to a protective cap (1 or 1*a*) for arranging on a cable, a corrugated pipe, or the like. The protective cap (1 or 1*a*) consists of two parts (4 or 4*a*, 5 or 5*a*), in particular two identical halves, wherein the two parts (4 or 4*a*, 5 or 5*a*) are connected together via a film hinge (6 or 6*a*), and at least one latch geometry (7 or 7*a*) is provided which connects the two parts (4 or 4*a*, 5 or 5*a*) together after folding. The at least one latch geometry (7 or 7*a*) is integrated into the interior of the protective cap (1 or 1*a*) and does not protrude beyond the outer surface thereof.

20 Claims, 5 Drawing Sheets

Protective cap

(56) References Cited

U.S. PATENT DOCUMENTS

| | | | | |
|---|---|---|---|---|
| 2008/0064251 | A1* | 3/2008 | Amidon | H01R 4/2433 439/418 |
| 2011/0108306 | A1* | 5/2011 | Parham, Jr. | H01R 24/64 174/81 |
| 2014/0127931 | A1* | 5/2014 | Urashima | H01R 13/516 439/352 |
| 2023/0104418 | A1* | 4/2023 | Krah | H01R 13/516 439/367 |

* cited by examiner

Straight

90° Model

Protective cap

Protective cap

Angled protective cap (in particular 90°)

PROTECTIVE CAP

CROSS REFERENCE TO RELATED APPLICATIONS

This application is the US-national stage of PCT application PCT/EP2021/077503 filed 6 Oct. 2021 and claiming the priority of German patent application 102020127339.8 itself filed 16 Oct. 2020.

The invention relates to a protective cap for a plug connector for mounting on cable, flexible conduit, or the like according to the features of the preamble of patent claim 1.

Plug connectors are known mounted on an end of a cable or flexible conduit. In order to prevent the cable from buckling in the rear end (the end facing away from the plug side of the plug-in connector) of the plug-in connector during handling, so-called antikink sleeves are provided in the transition region between this rear end of the plug-in connector and the outer end of the cable. These can also serve for sealing between the cable jacket and the housing of the plug connector. In addition to these antikink sleeves, it is known to provide so-called protective caps in the transition region across the end of the plug-in connector and the insertion region of the cable, as are shown, for example, at https://www.binder-connector.com or https://www.kabel-schmidt/de/.

However, these known protective caps have the disadvantage that they are not designed to be optimized for handling during assembly. This is disadvantageous in particular if such protective caps have to be mounted in large numbers by hand.

The object of the invention is therefore to improve the known protective caps in such a way that assembly of such protective caps in a larger number of parts is facilitated.

According to the invention, the object of the invention is attained in that the protective cap consists of two parts, in particular of two substantially identical halves, and the two parts are connected to one another via at least one film hinge and at least one latch formation is present that connects the two parts to each other after folding together, the at least one latch formation being integrated into the interior of the protective cap and not projecting beyond the outer surface thereof. Here, the at least one film hinge is preferably designed as a strap unitarily formed with both parts of the protective cap within its outer surface and has such a shape and length that the strap is recessed beneath the outer surface of the protective cap after the parts have been folded together.

As a result of this configuration, the at least one or the only film hinge is automatically retracted and does not form a projection that can injure a hand or get hooked in subsequent processes during handling. The at least one or only film hinge has a defined bending geometry, via which the draw-in process is defined or controlled.

In practice, the "defined bending geometry" is realized, for example, in that, as a result of the defined design of the length and position of the film hinge, it is tensioned when the protective cap halves are closed together and are automatically pulled tight against the inner housing wall. More than one film hinge is also possible.

For better fixing of the parts or the halves of the protective cap relative to one another, it is proposed that openings and projections complementary to each other, in the form of holes and pins, are provided on the opposite outer faces of the parts of the protective cap. This configuration ensures that the two parts of the protective cap are positioned precisely relative to one another after joining. As a result, a homogeneous transition occurs at the lateral grip formations. Offset is excluded, so that no sharp edges arise in the grip formations. When only one side is pressed during the assembly process by the worker or a mounting tool, the force is transmitted to the second side. Consequently, undesired forces acting on the latching, the flexible conduit or the plug are prevented.

Certain embodiments of the matching recesses and projections, for example in the form of holes or pins, are advisable.

For better handling, the protective cap has at least one grip formation on an outer surface. If the protective cap has straight feedthrough between the plug side and the cable side, it is expedient if the at least one grip formation is provided at the transition between the plug end and the cable end. In the case of such a protective cap, it is furthermore proposed that grip formations are provided on all outer surfaces of the protective cap. This is a roughness-optimized surface for improved adhesion.

The roughness of the surface can result from different shapes. In addition or as an alternative, it is likewise conceivable for it to be provided by applying an additional material (for example in a 2-component injection process, an adhesive strip or the like) to improve adhesion.

If the protective cap has a substantially round, oval or comparable cross-section, the grip formation is preferably provided completely circumferentially. Alternatively, grip formations can also be provided in sections (for example two sections that are provided opposite one another, or also more than two sections, preferably symmetrically distributed around the protective cap).

If the protective cap has a substantially square (for example approximately square or approximately rectangular) cross-section, the grip formations are preferably provided completely circumferentially. Alternatively, grip formations can also be provided, for example (for example two sections that are provided opposite one another, or also two further sections that are likewise situated opposite one another).

Furthermore, it is proposed that, in the case of a protective cap for a nonstraight angled connection between the plug end and the cable, the grip formations are provided on the rear side of the protective cap, i.e. on the opposite side of the plug end.

In order to further improve handling of the protective cap and to increase the adhesion to the grip formations, it is proposed that ridges or with grooves between form the grip formations. The flare shape between the cable and plug connection, in particular in the case of a coaxial configuration of the protective cap, provides an optimized undercut geometry for the best possible force transmission. Optimized rounding of the at least one grip formations, free of corners and edges, reduce the risk of injury of workers' hands and or fingertips during the assembly process.

In a further embodiment of the invention, reference is made to the drawings, in which embodiments of the invention are illustrated in a simplified manner. Therein:

DETAILED DESCRIPTION OF THE PREFERRED EMBODIMENTS

Figure 1:
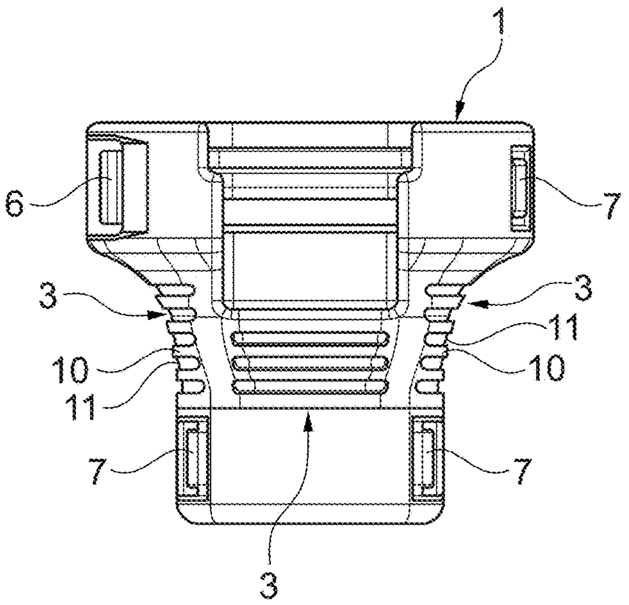
FIG. 1 is a side view of a protective cap with axial feedthrough between the plug and the cable.
Figure 2:
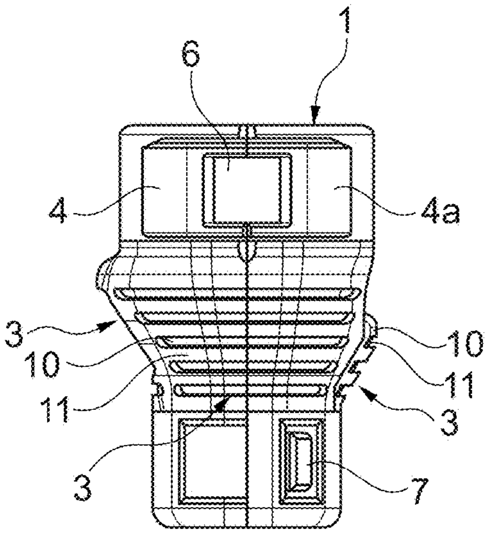
FIG. 2 is a side view of the protective cap according to FIG. 1.
Figure 3:
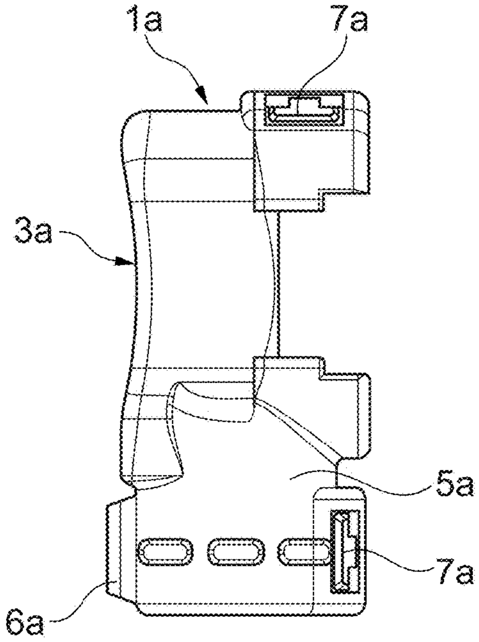
FIG. 3 is a side view of a protective cap with nonstraight through feed between the plug connector and the cable end.

Referring to FIGS. 1 to 11, reference 1 designates a protective cap made according to FIGS. 1, 2, 4 to 6 with straight feedthrough between a receptacle for a plug connector and cable, flexible conduit, or the like. A flexible conduit inside of which cable or flexible conduit runs to the plug-in connector, can also be provided on the connection opening designated by the reference number 2. Instead, the cable or its jacket can also be fitted directly into the connection opening 2.

The protective cap 1 has grip formations 3 on at least one outer surface, or on two outer surfaces (preferably two outer surfaces situated opposite one another) or, as shown in this embodiment, on all outer surfaces, which are formed by ridges 10 and grooves 11 or constrictions provided therebetween. As a result, the force is transferred from the hand without difficulty to the protective cap 1 and the plug (not shown). The protective cap 1 consists of two parts or halves 4 and 4*a* that can be joined together after insertion of the plug connector and of the flexible conduit or cable jacket or the like. The parts or halves 4 and 4*a* are connected to one another via a film hinge 6 and have latch formations 7 that, after joining the parts, lock the two halves 4 and 4*a* to each other.

For better fixation, pins 8 in part or half 4 fit into recesses 9 in the other half 4*a*, so that the two parts or halves 4 and 4*a* are fitted exactly together in the region of the grip formations 3 such that no edges or formations that could injure a user's hand project in the region of the grip formations 3.

Figure 4:
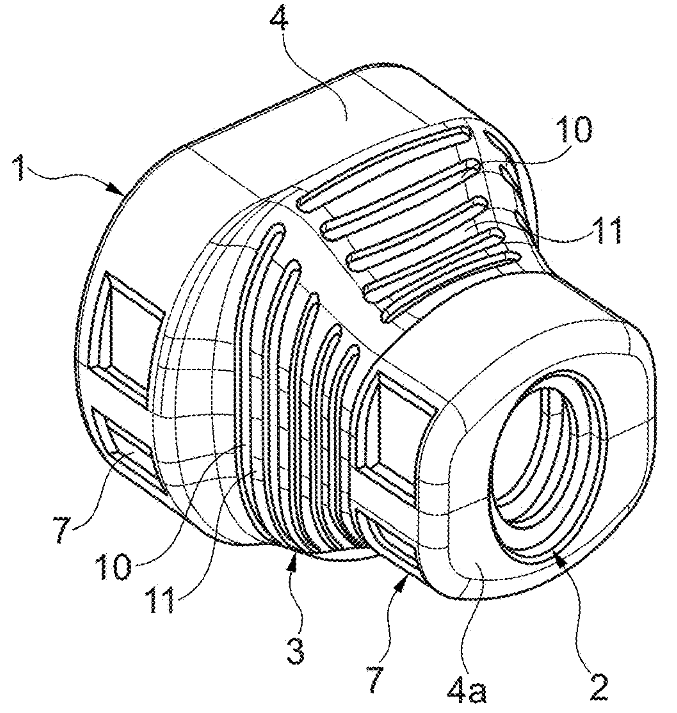
FIGS. 4 and 5 are perspective views of a straight feedthrough protective cap.
Figure 5:
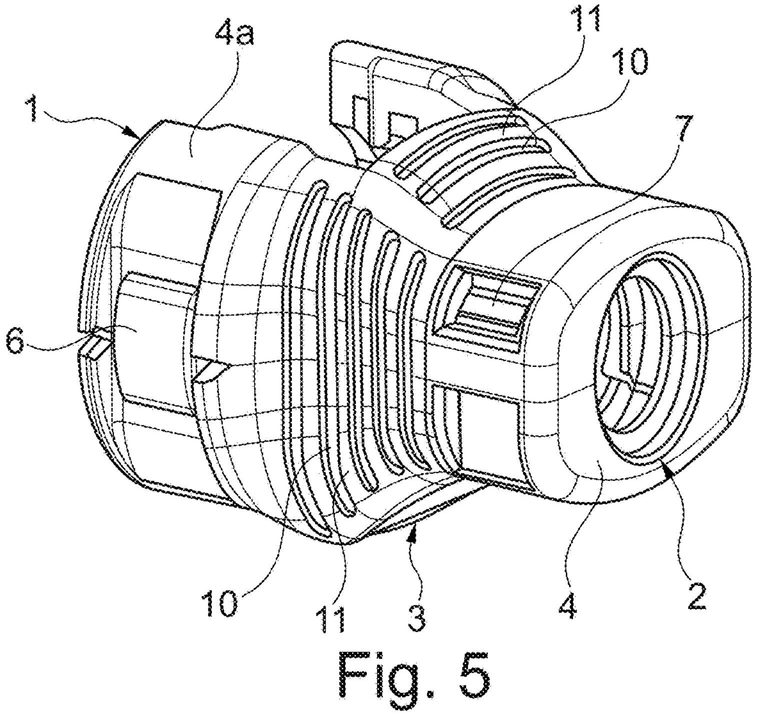
Figure 6:
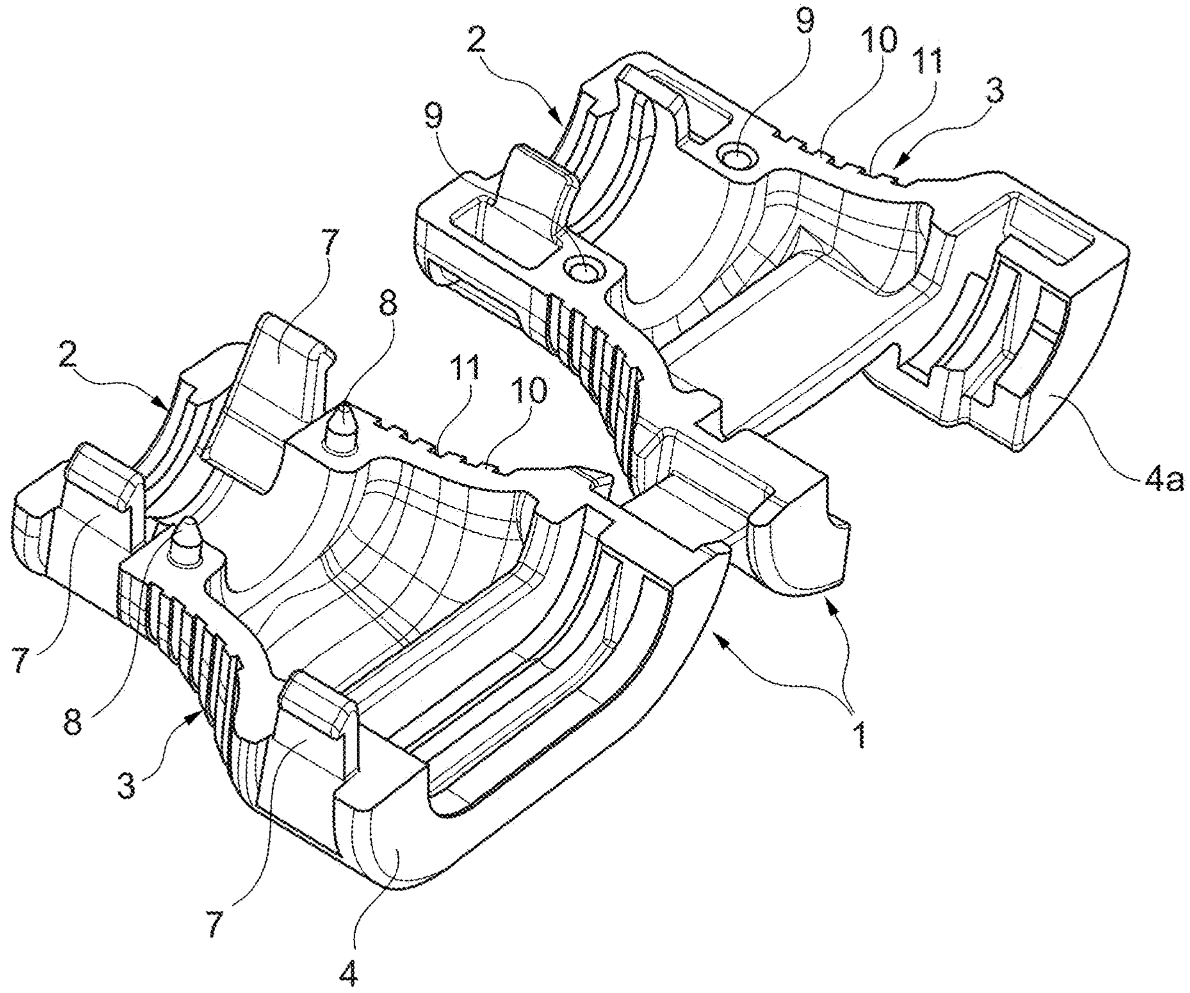
FIG. 6 shows a view of the protective cap according to FIGS. 1, 2, 4 and 5 opened up at a film hinge.
Figure 7:
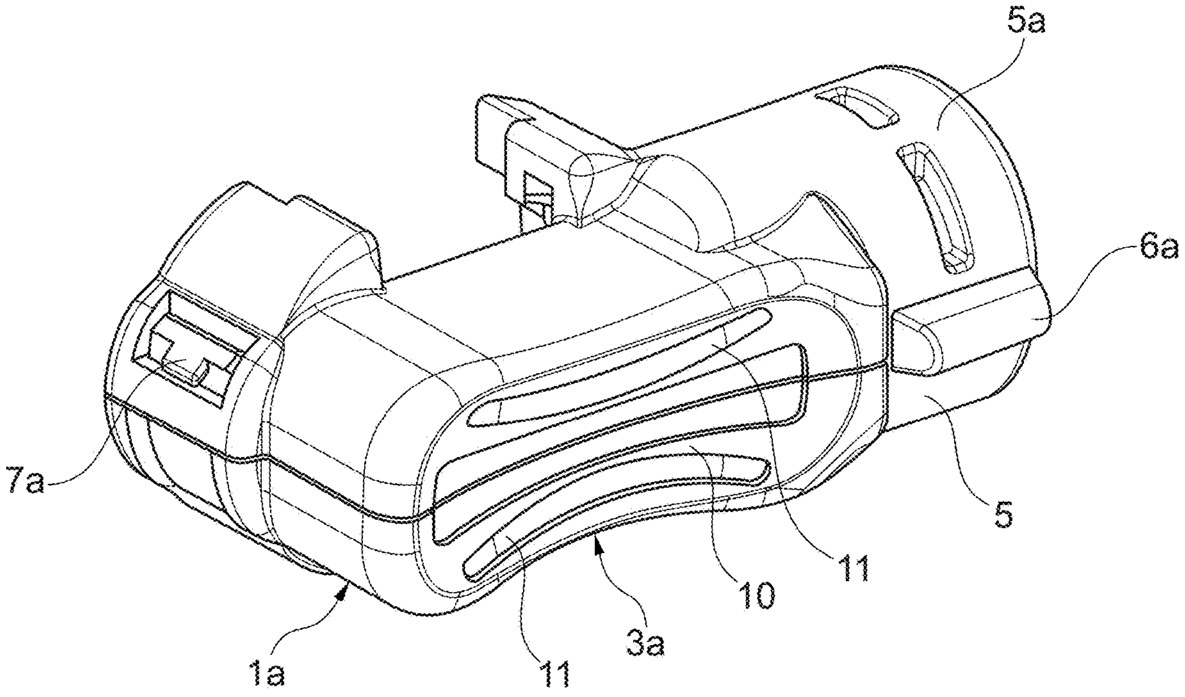
FIG. 7 is a perspective view of a protective cap with nonstraight through feed between the plug and the cable.
Figure 8:
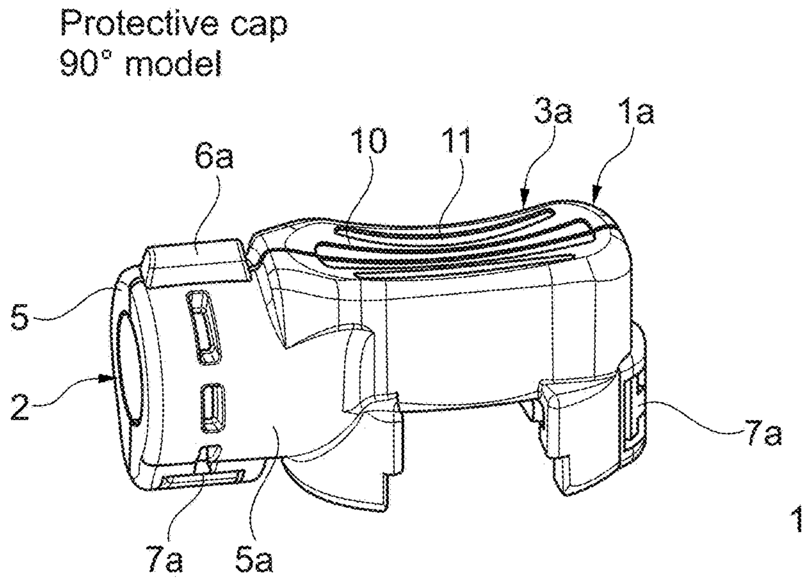
FIG. 8 is an angle view of a protective cap according to FIG. 7, and FIGS. 9 to 11 are end and side views of the protective cap according to FIGS. 3, 7 and 8.
Figure 10:
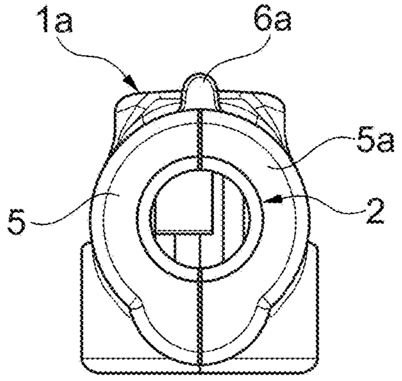
Figure 9:
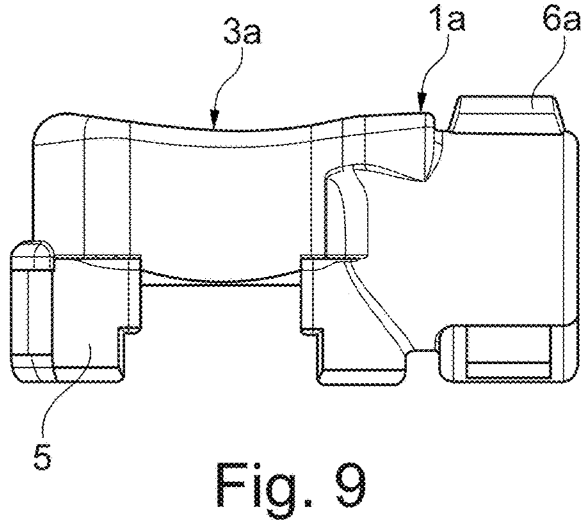
Figure 11:
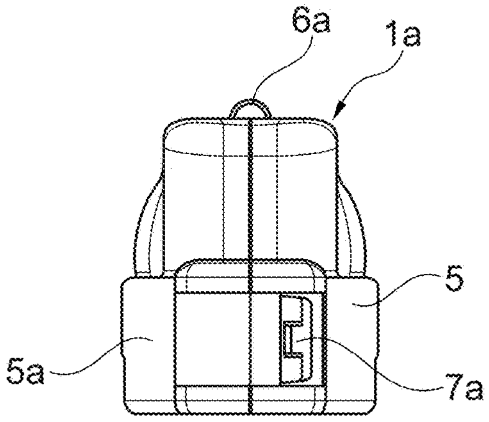

FIGS. 4 and 5 show, for example, that the protective cap 1 has a substantially rectangular cross-section, and the grip formations 3 are provided in sections (two sections that are present opposite one another on the shorter sides of the rectangle, and two further sections that are also opposite to the longer sides of the rectangle).

The grip formations provided at the sides when viewed in FIGS. 4 and 5 are used for optimum transmission of force during the plug-in process in which the protective cap 1 is used. The grip formations provided at the top and bottom when viewed in FIGS. 4 and 5 are optimized for handling the protective cap 1, not only during the plugging process, but also otherwise. In addition, the upper handle shape can optionally have a clearance (opening, recess or the like) for a securing element (also called CPA [connector position assurance]) that forms a plug connection consisting of plug connector and mating plug connector after being plugged together by actuating the securing element in order to prevent subsequent disassembly. In addition, in particular with reference to FIG. 5, it is once again pointed out that the film hinge 6 is recessed after its actuation, so that it no longer projects beyond the outer surface of the protective cap 1. The same applies to the latch formations 7 that, when viewed in FIGS. 4 and 5, is present as a whole exactly three times. Each of these latch formations is integrated (recessed) within the protective cap 1, so that they also do not project here. Of course, more or less than three latch formations 7 can also be used.

In FIGS. 3 and 7 to 11, the protective cap is shown at 1*a* and is designed such that an angle, in the present case a right angle, is formed between the receptacle for a plug and the connection opening 2. The grip formation 3*a* with the assigned ridges 10 and grooves 11 is provided on the side of the protective cap 1 facing away from the receptacle for the plug connector in order to be able to apply a rectilinear pressure to the plug connector during assembly. This protective cap 1*a* also has a film hinge 6*a* and latch formations 7*a*, so that the two parts 5, 5*a* or halves of this protective cap 1*a* can be easily fixed together.

LIST OF REFERENCE NUMERALS

- 1 Protective cap
- 2 Terminal opening
- 3, 3*a* Grip formations
- 4, 4*a*, 5, 5*a* Parts/halves
- 6, 6*a* Film hinges
- 7, 7*a* Latch formations
- 8 Pins
- 9 Recesses
- 10 Ridges
- 11 Grooves

The invention claimed is:

1. A protective cap for mounting on cable, flexible conduit, or the like, the protective cap comprising:

two parts;

a film hinge connecting the two parts to each other so that the two parts can fold together;

at least one latch formation connects the two parts to one another after folding together, the at least one latch formation being integrated into an interior of the protective cap so as not to project beyond an outer surface of the protective cap, the film hinge being unitarily formed with the two parts as a strap fixed to both of the two parts of the protective cap beneath the outer surface of the protective cap and having such a shape and length that the strap is recessed beneath the outer surface of the protective cap when the two parts are folded together; and holes and pins that are complementary one another on mutually confronting faces of the parts of the protective cap such that the pins engage into the corresponding holes when the two parts are folded together to help ensure that the two parts of the protective cap are positioned precisely relative to one another after joining.

2. The protective cap according to claim 1, wherein:

the holes have circular cross-sections; and the pins are cylindrical pins having circular cross-sections and tapered end portions to facilitate insertion into the holes.

3. The protective cap according to claim 1, further comprising at least one gripping formation on at least one outer surface of the protective cap.

4. The protective cap according to claim 3, wherein the at least one gripping formation is provided on the protective cap with straight through feed at a transition between a plug end and a cable end.

5. The protective cap according to claim 4, wherein the at least one grip formation comprises grip formations provided on all outer surfaces of the protective cap.

6. The protective cap according to claim 1, wherein grip formations are provided on a face side of the protective cap in a case of angular alignment between a plug end and a cable end.

7. The protective cap according to claim 1, wherein the two parts are formed as two substantially identical halves.

8. The protective cap according to claim 1, wherein the film hinge has a configuration such that the film hinge is automatically retracted and does not form a projection that can injure a hand or get hooked in subsequent processes during handling.

9. The protective cap according to claim 1, wherein the film hinge has a defined length and position of the film hinge such that the film hinge is tensioned when the two parts are closed together and automatically pulled tight against an inner housing wall of the protective cap.

10. The protective cap according to claim 1, further comprising:
- grip formations on all outer surfaces of the protective cap; and
- the pins are configured to engage into the corresponding holes when the two parts are folded together to help ensure that the two parts of the protective cap are positioned precisely relative to one another after joining, such that:
  - a homogeneous transition occurs at the grip formations without an offset so that no sharp edges arise in the grip formations; and
  - when a force is pressed against only one side of the protective cap during an assembly process by a worker or a mounting tool, the force is transmitted to a second side of the protective cap, whereby undesired forces acting on the latching, the flexible conduit or the plug are avoided.

11. The protective cap according to claim 1, wherein:
- the protective cap comprises grip formations on all outer surfaces of the protective cap;
- the grip formations are formed by ridges with grooves between the ridges; and
- the ridges are rounded and free of corners and edges to thereby reduce a risk of injury of a worker's hands and/or fingertips during an assembly process.

12. The protective cap according to claim 1, further comprising:
- grip formations on all outer surfaces of the protective cap; and
- the pins are configured to engage into the corresponding holes when the two parts are folded together such that the two parts are fitted exactly together in a region of the grip formations such that no edges or formations that could injure a user's hand project in the region of the grip formations.

13. The protective cap according to claim 1, further comprising:
- grip formations provided along outer side surfaces of the protective cap that are used for optimum transmission of force during a plug in process in which the protective cap is used; and
- grip formations provided along top and bottom outer surface of the protective cap that are optimized for handling the protective cap not only during a plugging process but also otherwise.

14. The protective cap according to claim 13, wherein:
- the grip formations are formed by ridges with grooves between the ridges; and
- the ridges are rounded and free of corners and edges to thereby reduce a risk of injury of a worker's hands and/or fingertips during an assembly process.

15. The protective cap according to claim 1, wherein the protective cap comprises an upper handle shape with a clearance for a securing element that forms a plug connection consisting of a plug connector and a mating plug connector after being plugged together by actuating the securing element in order to prevent subsequent disassembly.

16. The protective cap according to claim 1, wherein the protective cap is configured such that:
- the film hinge is recessed after its actuation, so that the film hinge no longer projects beyond the outer surface of the protective cap; and
- each said latch formation is integrated within the protective cap, such that each said latch formation is recessed within the protective cap and does not project beyond the outer surface of the protective cap.

17. The protective cap according to claim 1, further comprising:
- grip formations provided along outer side surfaces of the protective cap that are used for optimum transmission of force during a plug in process in which the protective cap is used;
- grip formations provided along top and bottom outer surface of the protective cap that are optimized for handling the protective cap not only during a plugging process but also otherwise; and
- the pins are configured to engage into the corresponding holes when the two parts are folded together to help ensure that the two parts of the protective cap are positioned precisely relative to one another after joining, such that:
  - a homogeneous transition occurs at the grip formations without an offset so that no sharp edges arise in the grip formations; and
  - when a force is pressed against only one side of the protective cap during an assembly process by a worker or a mounting tool, the force is transmitted to a second side of the protective cap, whereby undesired forces acting on the at least one latch formation, the flexible conduit, or a plug are avoided.

18. The protective cap according to claim 17, wherein:
- the grip formations are formed by ridges with grooves between the ridges; and
- the ridges are rounded and free of corners and edges to thereby reduce a risk of injury of a worker's hands and/or fingertips during an assembly process.

19. The protective cap according to claim 18, wherein the protective cap comprises an upper handle shape with a clearance for a securing element that forms a plug connection consisting of a plug connector and a mating plug connector after being plugged together by actuating the securing element in order to prevent subsequent disassembly.

20. The protective cap according to claim 19, wherein
- the holes have circular cross-sections; and
- the pins are cylindrical pins having circular cross-sections and tapered end portions to facilitate insertion into the holes.

* * * * *